United States Patent Office 2,852,399
Patented Sept. 16, 1958

2,852,399

REFRACTORY BINDER CHIEFLY FOR WAX AND THE LIKE MOLDING METHODS

Jean Bellezanne, Neuilly-sur-Seine, France

No Drawing. Application December 6, 1954
Serial No. 473,430

Claims priority, application France December 7, 1953

3 Claims. (Cl. 106—38.22)

In the casting method wherein the molding is carried out in a mold of wax or plastic material over a casting model, it is customary to coat the wax or plastic material model with a first refractory coat of a reduced thickness, either by immersion or by spraying with a gun.

Said refractory coat is formed of a refractory powder such for instance as zircon, sillimanite, mullite, or the like refractory material passing through meshes of a very fine sieve having 200 to 300 meshes, the pulverulent particles of the refractory material being agglutinated through the agency of a binder which is also refractory.

Now I have found that butyl titanate provided particularly satisfactory results as compared with any known binders used hitherto.

Butyl titanate is an alcoholate of butyl alcohol the chemical formula of which is $(C_4H_9O)_4Ti$. It is prepared by the action of titanium tetrachloride on butyl alcohol.

In order to obtain a binder having as a basis butyl titanate, I dilute the latter by means of an organic solvent such as xylene, isooctane, isohexane, solvent naphtha, benzene, chloroform, carbon tetrachloride, ether, or the like, the solution being made in proportions which may reach between 0.5 and 50% of butyl titanate.

Said binder is used after admixture in a mixer with the refractory product, the mixture containing between about 10 and 50% of the binder by weight of refractory material.

By way of example, excellent results have been obtained with a binder comprising 80 parts of xylene, and 20 parts of butyl titanate.

After the coating has been effected, it is preferable to dry the coat in a kiln at a temperature of about 50° C. or simply in the open before it is enclosed inside a further refractory material which forms the actual mass of the mold which is to be subsequently used for casting purposes.

This refractory material may be formed of silicate, sillimanite, or any other suitable refractory substance the particles of which pass through a sieve having larger meshes than in the preceding case, say a 30 mesh sieve, if a 200 mesh sieve has been used for the actual coat. Said further refractory material may be bound by the same solution of butyl titanate as in the case of the coat.

The following examples are illustrative of the present invention:

A coat of refractory material may comprise about 80 parts by weight of pulverulent zircon, 16 parts of xylene, and 4 parts of butyl titanate dissolved in the latter.

A refractory composition according to the present invention may comprise about 80 parts of sillimanite in a pulverulent state, 16 parts by weight of xylene, and 4 parts of butyl titanate.

A refractory composition may be produced by dissolving butyl titanate in an organic solvent in which butyl titanate is soluble, incorporating the solution into about 4 times its weight of pulverulent refractory material, and drying the mixture.

What I claim is:

1. A refractory composition chiefly for use in the casting over a wax or like casting model, constituted by about 80 parts by weight of pulverulent zircon, 4 parts by weight of butyl titanate dissolved in 16 parts by weight of xylene.

2. A refractory composition chiefly for use in the casting over a wax or like casting model, consisting essentially of about 80 parts by weight of pulverulent refractory material selected from the group consisting of zircon, sillimanite, and mullite, 4 parts by weight of butyl titanate dissolved in 16 parts by weight of an organic solvent selected from the group consisting of xylene, isooctane, isohexane, solvent naphtha, benzene, chloroform, carbon tetrachloride, and ether.

3. A refractory composition chiefly for use in the casting over a wax or like casting model, consisting essentially of about 50–90% by weight of an appropriate pulverulent refractory material selected from the group consisting of zircon, sillimanite, and mullite in a bonding solution of butyl titanate in an organic solvent selected from the group consisting of xylene, isooctane, isohexane, solvent naphtha, benzene, chloroform, carbon tetrachloride, and ether, in proportions between 0.5 and 50% of butyl titanate to the solvent.

References Cited in the file of this patent

UNITED STATES PATENTS

| | | |
|---|---|---|
| 1,872,876 | Bjorkstedt | Aug. 23, 1932 |
| 2,102,444 | VanAllen | Dec. 14, 1937 |
| 2,345,211 | Neiman | Mar. 28, 1944 |
| 2,383,812 | Navias | Aug. 28, 1945 |
| 2,732,799 | Haslam | Jan. 31, 1956 |

OTHER REFERENCES

Kraitzer et al.: Esters of Titanium, Journal Oil Colour Chem. Assoc., volume 31 (1948) (pages 405–408).